United States Patent [19]

Cuthbertson et al.

[11] 3,925,273

[45] Dec. 9, 1975

[54] OIL-IN-WATER TRANSFER PRINTING EMULSIONS AND METHOD

[75] Inventors: Edmond N. Cuthbertson, Otley, England; Raymond Davenport, Dover, N.J.

[73] Assignee: Sandoz, Inc., East Hanover, N.J.

[22] Filed: Aug. 5, 1974

[21] Appl. No.: 494,551

[52] U.S. Cl.................... 260/17 A; 8/2.5; 106/171; 260/17.4 ST; 427/146
[51] Int. Cl.².................. C08L 1/26; C08L 5/04
[58] Field of Search ......... 260/17, 17.4 ST, 29.6 B, 260/29.6 SQ, 29.6 WQ; 8/2.5; 117/36.2; 106/171; 427/146

[56] References Cited
UNITED STATES PATENTS

| 3,782,896 | 1/1974 | DeFago et al. | 8/2.5 |
| 3,846,069 | 11/1974 | Angliker et al. | 8/2.5 |

FOREIGN PATENTS OR APPLICATIONS

| 1,211,149 | 11/1970 | United Kingdom | 8/2.5 |

*Primary Examiner*—Melvyn I. Marquis
*Assistant Examiner*—Edward Woodberry
*Attorney, Agent, or Firm*—Gerald D. Sharkin; Richard E. Vila; Joseph J. Borovian

[57] ABSTRACT

The invention relates to essentially aqueous stable oil-in-water printing emulsions, particularly suitable for use in transfer printing processes.

11 Claims, No Drawings

OIL-IN-WATER TRANSFER PRINTING EMULSIONS AND METHOD

It is known to print textile materials that are in the form of webs by means of textile printing machines that have engraved rollers. Recently, transfer printing has become known. Transfer printing is a single stage, non-aqueous heat process in which dispersed dyestuffs are transferred from paper to a suitable substrate via the vapor phase, under controlled conditions of time, temperature and pressure. Such transfer printing processes are described in French Pat. No. 1,223,330 and in Swiss Pat. No. 476,893, wherein solvent-based printing inks are used.

Considerable interest exists in printing transfer paper on existing textile machinery rather than paper machinery, thus the convenience of employing the same type of machine for both conventional fabric printing and for the printing of heat transfer paper. The rotary screen machine is an obvious choice, but flat bed machines can also be used. However, the solvent-based inks cannot be used because they clog these types of machines. A suitable printing ink for use on textile machinery would be aqueous-based, but the prior art has not to our knowledge been able to provide a satisfactory aqueous ink for transfer printing.

Accordingly, an object of this invention is to provide essentially aqueous-based printing inks for transfer printing use.

Still another object of this invention is to provide a process for printing textiles wherein a colored pattern formed on paper from an aqueous-based printing ink can be heat transferred onto a textile substrate.

In accordance with the present invention, there are provided oil-in-water emulsion printing pastes comprising per 100 parts by total weight of the emulsion:

a. 0.5 to 6 parts by weight of a sublimable disperse dye, b. 1 to 15 parts by weight of an anionic dispersing agent, said dispersing agent being present in a weight ratio of at least 0.4 part per part by weight of dye, c. 0.25 to 4 parts by weight of a water soluble film-forming resin, d. 0.05 to 4 parts by weight of a non-ionic emulsifying agent, e. 5 to 25 parts by weight of a hydrocarbon mineral oil which has an International boiling point of at least 290°F. and which is at least 50% distilled in the boiling range of from 300°F. to 450°F., f. 45 to 95 parts by weight of water, and g. up to 5 parts by weight of a solid water soluble viscosity modifying agent to provide a final emulsion viscosity in the range of from 800 to 5,000 centipoises at 25°C., preferably 1,500 to 3,500 centipoises at 25°C.

Also provided by the present invention are print paste emulsion concentrates dilutable with water and/or aqueous solution of solid water soluble viscosity modifying agents to form te print paste emulsions above-described, said concentrates comprising, per 100 parts by total concentrate weight:

a. 5 to 12 parts by weight of a sublimable disperse dye, b. 2 to 18 parts by weight of an anionic dispersing agent, said dispersing agent being present in a weight ratio of at least 0.4 part per part by weight of dye, c. 2.5 to 12 parts by weight of a water soluble film-forming resin, 0.5 to 12 parts by weight of a non-ionic emulsifying agent, e. 30 to 60 parts by weight of a hydrocarbon mineral oil which has an International boiling point of at least 290°F. and which is at least 50% distilled in the boiling range of from 300°F. to 450°F., and f. 15 to 40 parts by weight of water.

In another aspect of the present invention, there is provided a process for printing textiles wherein a colored pattern is transferred from an auxiliary or intermediate carrier onto a textile substrate, characterized by first coating the auxiliary carrier with an emulsion composition containing a disperse dyestuff as described above to print the surface of the carrier, thereafter bringing the printed surface in contact with the textile to be printed and subjecting the laminate to elevated temperatures whereby the dispersed dye essentially sublimes or vaporizes from the carrier onto the textile.

A particular advantage of the above process is that it may be effectively carried out employing textile machinery throughout, thus offering a particularly valuable convenience to the printer.

The term "disperse dye" as used herein is intended to means those water insoluble or sparingly water-soluble dyes, usually finely divided, which are well known in the art as disperse or dispersed dyes. The use of disperse dyes which are sublimable in transfer printing compositions is also well known. In general, it is preferred to employ the more readily sublimable disperse dyes which are of the low and medium energy type, which are classified in the art by the known designations (E) and (SE), respectively. Mixtures of disperse dyes may, of course, be used to provide various desired colors, and such mixtures preferably are prepared from dyes of approximately similar energy characteristics. The nature of the textile substrates is also a guiding factor in the selection of dyes, as is well known. In this connection, reference may be made to the dyes described in H. E. Fiarz-David, L. Blangey Grundlegende Operationen der Farbenchemie, Vienna 1952, and the Colour Index, third edition, Vols. I and II, Pages 1001–1562, 1607–1688, 2005–2478, and 2479–2742. The amount of disperse dye in the printing pastes is preferably from 1.0 to 5 parts and the amount in the concentrates is preferably 6 to 10 parts. Representative dyes which are particularly suitable, as designated by Colour Index Number, are Disperse Yellow 3, 23, 49, 54 and 82; Disperse Orange 20, 21, and 25; Disperse Red 60 and 65; Disperse Violet 1, 23 and 29; and Disperse Blue 19, 26 and 64.

Dispersed dyes by definition are those which are insoluble or only sparingly soluble in water. While the compositions of the invention contain a hydrocarbon oil in which at least a portion of the dispersed dye may be dissolved, it has been found important to include in the composition substantial quantities of an anionic dispersing agent, i.e., an anionic agent suitable for dispersing or facilitating the dispersion of a dispersed dye in water, the optimum amount of dispersing agent varying with the amount and type of dye in the composition, with the minimum amount representing about 0.4 part by weight per part by weight of dye. The weight ratio of dispersing agent to dye is usually in the range of 0.4:1 to 3:1, more usually 0.6:1 to 2.5:1. The anionic dispersing agents of choice for use in the compositions are the "sulfonate" type dispersing agents, i.e., those organic dispersing agents containing one or more sulfonic acid groups which may also be in alkali metal salt form, commonly the sodium salt form. The sulfonate dispersing agents which are desirably employed are the lignin sulfonates and condensed naphthalene sulfonates (condensation products of naphthalene sulfonic acid or its naphthalenic derivatives with formaldehyde, e.g., the disodium salt of methylene dinaphthalenesulfonic acid), both of which types are well known in the art. The amount of anionic dispersing agent in the printing pastes is preferably 1.0 to 12 parts and the amount in the concentrates is preferably 6 to 16 parts.

The film-forming resin employed in the compositions of the invention is a water-soluble, film-forming resin, i.e., capable of dissolving in water in such an amount that a continuous film is formed when the solution is deposited on a surface and dried. The main function of the film-forming resin is to serve as a temporary but releasable binder for the dye on the cellulosic substrate to be printed with the printing pastes of the invention. For this purpose the film-forming resin is desirably essentially insoluble in the hydrocarbon mineral oil and capable of softening to release the dye during the transfer process, i.e., it desirably has a softening point below 400°F., preferably between 100°F. and 340°F. Particularly suitable as such water-soluble, film-forming resins are the water-soluble polyvinyl alcohols and cellulose ethers. The preferred film-forming resins are the polyvinyl alcohols, particularly those having a viscosity of 4 to 80 centipoises for a 4.0% by weight water solution at 20°C. as measured by the Hoeppler falling ball method, more preferably a viscosity of 8 to 40 centipoises. Polyvinyl alcohols are commonly prepared by polymerization of vinyl acetate and hydrolysis of the acetate groups. The preferred polyvinyl alcohols are at least 70% hydrolyzed, more preferably at least 80%. The preferred cellulose ethers are those of known type in which the ether moiety (excluding the ether oxygen atom and any salt-forming alkali metal) consists of carbon and hydrogen or carbon, hydrogen and oxygen atoms, are of low molecular weight, e.g., not exceeding 70, and more preferably contain 1 or 2 carbon atoms. Examples of such cellulose ethers include ethylcellulose, methylcellulose, carboxymethylcellulose (and its sodium salt) and hydroxyethylcellulose, the more preferred being carboxymethylcellulose (and its sodium salt) and hydroxyethylcellulose. The amount of the film-forming resin in the printing pastes is preferably from 0.5 to 2.5 parts and the amount in the concentrates is preferably 3.0 to 8 parts.

The emulsifying agent employed to form and maintain the oil-in-water emulsions of the invention is a nonionic emulsifying agent and such types of emulsifying agents are well known. The particularly suitable emulsifying agents are those formed on condensing an alkylene oxide of 2 to 4 carbon atoms with certain known aliphatic and aromatic alcohols and aliphatic acids and desirably those formed with relatively high contents of alkylene oxide, i.e., the longer polyoxyalkylene chains, preferably ethylene oxide. Such emulsifying agents may be represented by the formula A:

RZ [CH$_2$(CH$_2$)$_n$)]$_x$—CH$_2$(CH$_2$)$_n$—OH     A wherein R is: a) the residue of a fatty acid and has 9 to 21 carbon atoms, preferably 11 to 19 carbon atoms and no more than 2 double bonds per molecule, preferably no more than 1 double bond; or b) a benzene nucleus substituted by at least one hydrocarbon group having 6 to 12 carbon atoms and optionally further substituted by 1 to 3 hydrocarbon groups of 1 to 12 carbon atoms; n is 1 to 3; x is 3 to 80; and Z is —CH$_2$O— or —COO—, provided that Z is —CH$_2$O— when R is a benzene nucleus. The particularly preferred agents are those in which x is 15 to 80, especially 15 to 40, and more preferably those in which R is the residue of a fatty acid, especially with Z being —CH$_2$O—. Representative examples of preferred agent are those in which R is derived from oleic, stearic and palmitic acid, and mixtures thereof, x is 1, Z is —CH$_2$O— and n is 20-30. The amount of emulsifying agent in the printing pastes is preferably from 0.2 to 3 parts and the amount in the concentrates is preferably 1 to 10 parts.

The hydrocarbon mineral oil which forms the discontinuous phase in the printing pastes and concentrates provided by the invention is an important factor in providing an efficient transfer of the dye from the cellulosic substrate or transfer paper to the fabric. Similar aqueous printing pastes prepared without the hydrocarbon mineral oil were found to result in the transfer of substantially less dye and were regarded as critically inefficient. While there may be a number of reasons for the importance of the hydrocarbon mineral oil, it is believed that the oil assists in efficient transfer by being partially absorbed by the cellulosic substrate and thereby inhibits the absorption of the dye by the substrate, whereby the dye can be more readily sublimed without interference by the paper. The hydrocarbon mineral oils employed in the invention are those which have an International boiling point (ASTM D 86) of 290°F. to 420°F., preferably 300°F. to 400°F., and the characteristic of being at least 50% distilled in the boiling range of from 300°F. to 450°F., preferably 50% distilled in the range of from 320°F. to 420°F. While the precise chemical nature of many useful hydrocarbon oils is not known, it is also generally preferred to employ those oils which contain at least 50% by weight saturated hydrocarbons and not greater than 50% aromatic hydrocarbons, preferably 60% or more saturated hydrocarbons with a total of at least 25%, more preferably 30%, being paraffins. Examples of the more suitable commercially available petroleum derived mineral oils include: Varsol No. 1 (petroleum hydrocarbon oil, approximately 15% aromatics, .15% olefins and 85% saturated hydrocarbons), Varsol No. 2 (petroleum hydrocarbon oil, approximately 32% aromatics, .1% olefins and 68% saturated hydrocarbons, and ISOPAR L (petroleum hydrocarbon oil, approximately 0.2% aromatics, 0.05% olefins and 99.7% saturated hydrocarbons). Minor quantities of simple aromatics such as toluene and xylene can be utilized to improve the drying properties of the pastes. The amount of hydrocarbon oil in the printing pastes is preferably 10 to 23 parts and the amount in the concentrates is preferably 40 to 55 parts.

The printing pastes of the invention contain water in an amount of 45 to 95 parts by weight, preferably 60 to 90 parts. While water and the dye, dispersing agents, hydrocarbon oil, emulsifying agent and film-forming resin constitute the essential components of the printing pastes, it is also, of course, necessary that the printing pastes have a consistency or viscosity which enables the pastes to be satisfactorily printed. Suitable viscosities are in the range of from 800 to 5,000 centipoises at 25°C., preferably 1,500 to 3,500 centipoises at 25°C., as measured on the Brookfield viscosimeter. The various essential ingredients of the paste, especially the film-forming resin, influence the viscosity of the paste and may be sufficient to provide the desired viscosity. If the desired viscosity is not obtained with the essential ingredients, it is in order to add solid water soluble viscosity modifying agents to increase the viscosity to the desired level. Viscosity modifying agents are well known and many known types may be used in the pastes of the invention. A number of such modifying agents are or tend to be film-forming agents and can affect the ability of the dye to be released from prints formed by the paste as well as providing a medium for the dye. Accordingly, while the chemical character of suitable viscosity modifying agents may vary, it is judged important to employ the more efficient viscosity modifying agents such that the desired viscosity can be achieved with no more than 5 parts of added modifying agents, desirably no more than 3 parts, and such that the total weight of film-forming resin and viscosity modifying agent does not exceed 9 parts, desirably not more than 5.5 parts. Particularly suitable as viscosity modifying agents are those carbohydrates generally classed as polysaccharides including their water-soluble derivatives and alkali metal salts. It is generally preferred to employ those polysaccharides which are classed as homopolysaccharides including their water-soluble derivatives and alkali metal salts. Examples of such materials include the cellulose ethers previously mentioned as film-forming resins and sodium alginate, the latter being particularly preferred.

Various other components usually employed in printing pastes and not adversely affecting the integrity of the pastes of the invention may be used in the compositions of the invention. For example, is is appropriate for storage purposes to add minor quantities of a preservative to inhibit the degradation of organic components such as the film-forming resin and viscosity modifying agents. Such preservatives may be present in an amount of from 0.01 to 0.1 part per 100 parts of paste. An example of such a preservative is sodium o-phenylphenate which is obtainable under the trademark Dowicide A. The printing paste may also contain minor quantities of various electrolytes but extreme caution should be taken with regard to the amount and/or character of any such electrolytes in order to avoid any substantial adverse effect on the stability of the emulsion or the pH of the printing paste which should be in the range of pH 4.0 to 8.5, preferably pH 5.0 to 7.0.

The emulsions of the invention are readily prepared by conventional emulsion-forming methods which lead to "oil-in-water" emulsions. The important step is that the aqueous phase be prepared and that the solvent be slowly added to the aqueous phase with stirring. The order of mixing the other ingredients is less important. To achieve an optimum advantage from the present invention, these emulsions will generally contain a low content of total solids, preferably below 25% and, more preferably, in the range of 5 to 20%.

By the term "intermediate or auxiliary carrier" required for the transfer printing process is meant any cellulosic sheet or film material, which is of any desired structure, preferably non-textile structures, heat stable to the transfer temperature, preferably paper.

The textile substrate may be in the most diverse forms, for example, in woven, knitted, non-woven or other convenient form, and made of all types of natural and synthetic fibers and fiber-forming materials. The term "fiber" is inclusive or single filaments, bundles of filaments, twisted and untwisted, such as yarn, roving, sliver, warps, and cards. Substrates of particular interest are those comprising polyamide, polyacrylonitrile, polyester, cellulose triacetate, viscose rayon, cuprammonium rayon or cotton fibers.

The emulsions of the invention are conveniently applied to the carrier in the form of a paste employing the most diverse forms of printing techniques, e.g., the planographic (off-set) process and the relief-printing (rotary gravure) process and particularly the soft-ground etching (silk screen) process. After application of the paste thereto, the carrier is heated in the presence of air flow to a temperature between 70°F. and 300°F., preferably between 150°F. and 280°F. for a period between 1 and 5 minutes.

The transfer printing operation is performed in the usual manner whereby the printed carrier is placed against a textile substrate and heated to a temperature between 340°F. and 500°F., preferably between 360°F. and 480°F. for a time between 5 seconds and 2 minutes, preferably between 10 and 60 seconds, wherein the print is transferred from the carrier onto the substrate. In the process, the temperature conforms up to the thermal resistance or according to the behavior of flow of the substrate to be printed in the transfer process. Thus, the process is carried out, for example, in the case of acetate at temperatures ranging approximately between 340°F. and 460°F., in the case of acrylics between 340°F. and 400°F., in the case of nylon between 340°F. and 480°F., in the case of polyester between 360°F. and 480°F., and in the case of triacetate between 340°F. and 440°F.

Mechanical pressure, e.g., using calender rolls or printing platens, can be applied to the textile substrate and carrier during heating. The heating may also be effected while the carrier and substrate are under reduced pressure. In general, the nature of the substrate determines the use of one or the other of these methods.

Where a porous carrier material is used, a controlled current of superheated steam can be made to permeate the carrier and textile substrate to give more efficient transfer of the dyestuff and to promote penetration into the substrate. By this means pile fabrics can be printed with satisfactory penetration without recourse to high mechanical pressure, which is often detrimental to such fabrics. Also, such porous carriers absorb relatively large amounts of print material.

The following examples illustrate the preferred procedure to be followed in accordance with this invention; however, it should be understood that the examples are all illustrative only and not exclusive.

EXAMPLE 1

Preparation of 20% ELVANOL 90–50 solution.

240 parts of water at room temperature are stirred sufficiently with an agitator to produce a vortex. Into the vortex is sifted 60 parts of ELVANOL 90–50 (DuPont trademark for a low viscosity fully hydrolyzed polyvinyl alcohol) at a rate to ensure rapid wetting out and complete dispersibility. The resultant slurry is stirred for an additional 10–15 minutes, at which time the temperature is raised to 190°–200°F. and the stirring continued to allow complete dissolution of the ELVANOL 90–50.

EXAMPLE 2

Preparation of Emulsion Base.

One part of Dowicide A (sodium o-phenylphenate) is dispersed in 131 parts of water by means of a homogenizer. To the resultant dispersion is added 237 parts of the 20% ELVANOL 90–50 solution as prepared in Example 1 and 38 parts of EKALINE G-80 (condensation product of a $C_{18}$ fatty alcohol and from 22 to 28 mols of ethylene oxide) and the mixture stirred. To the resultant mixture is added slowly over the course of 20–30 minutes with stirring 593 parts of ISOPAR L (a heavy narrow cut of mineral spirits containing 92.7% paraffins) to form the emulsion.

EXAMPLE 3

Preparation of Concentrated Dyestuff Emulsions.

A. To 100 parts of the Emulsion Base as prepared in Example 2 is added slowly with stirring at room temperature 20 parts of Foron Brilliant Yellow E-3GFL (including 10 to 16 parts of sulfonate dispersing agents).

B. To 100 parts of the Emulsion Base as prepared in Example 2 is added slowly with stirring at room temperature 20 parts of Foron Brilliant Orange E-RL (including 10 to 16 parts sulfonate dispersing agents).

C. To 100 parts of the Emulsion Base as prepared in Example 2 is added slowly with stirring at room temperature 14 parts of Foron Brilliant Violet E-BLN, 6 parts of Disperse Blue 56, 6 parts of Disperse Blue 26, and 6 parts of Foron Brilliant Yellow E-3GFL (each of said dispersed dyestuffs containing 40 to 80% sulfonate dispersing agents).

EXAMPLE 4

A print paste is prepared by mixing 30 parts of Concentrate A from Example 3, 30 parts of water and 30 parts of a 4% sodium alginate thickener solution of sodium alginate obtained under the trademark KELTEX. The viscosity of the resultant mixture is adjusted to about 2800 cps. at 25°C. by the addition of either water or 20% KELTEX solution.

a. The printing paste obtained is imprinted on paper (Tapestry Stock No. 1 weighing 260 g/m² and having a Cobb value of 18.7) employing a Buser Rotary Wallpaper printing machine, thus providing an intermediate carrier paper suitable for the transfer printing process.

b. The dyestuff of the intermediate carrier paper is transferred to polyester fabric on a Gessner machine for 30 seconds at 390°F. to give a yellow print of very good fastness to dry heat, light and wet processing.

EXAMPLE 5

Proceeding in a manner analagous to Example 4, and using in place of Concentrate A, an equivalent amount of Concentrate B from Example 3, a print paste is prepared. In a manner analagous to Examples 4(a) and 4(b), an intermediate carrier paper is produced and the transfer process is carried out on polyester fabric to give an orange print having very good fastness to light and wet processing.

EXAMPLE 6

Proceeding in a manner analagous to Example 4, and employing a mixture of 30 parts of Concentrate C from Example 3, 15 parts of water and 20 parts of a 4% KELTEX solution, a print paste is prepared. In a manner analagous to Examples 4(a) and 4(b), an intermediate carrier paper is produced and the transfer process is carried out on polyester fabric to give a black print having very good fastness to dry heat, light and wet processing.

Substituting an aqueous solution of hydroxyethylcellulose for the KELTEX in Example 4, above, similarly good results are obtained with the resulting printing paste.

As many different embodiments of this invention may be made without departing from the spirit and scope thereof, it is to be understood that the invention is not limited to the specific embodiments disclosed herein.

What is claimed is:

1. A heat transfer printing paste comprising a hydrocarbon mineral oil-in-water emulsion consisting essentially of, per 100 total parts by weight: a) 0.5 to 6 parts by weight of a sublimable disperse dye; b) 1 to 15 parts by weight of an anionic sulfonate dispersing agent, said dispersing agent being present in a weight ratio of at least 0.4 part per part by weight of dye; c) 0.25 to 4 parts by weight of a water soluble film-forming resin selected from the group consisting of a polyvinyl alcohol, a cellulose ether and mixtures thereof; d) 0.05 to 4 parts by weight of a non-ionic emulsifying agent; e) 5 to 25 parts by weight of a hydrocarbon mineral oil which has an International boiling point in the range of 290°F. to 420°F. and which is at least 50% distilled in the boiling range of from 300°F. to 450°F.; f) 45 to 95 parts by weight of water; and g) up to 5 parts by weight of a solid water soluble polysaccharide viscosity modifying agent to provide a final emulsion viscosity in the range of 800 to 5,000 centipoises at 25°C., said paste having a pH of 4.0 to 8.5.

2. A heat transfer printing paste in accordance with claim 1 comprising a hydrocarbon mineral oil-in-water emulsion consisting essentially of, per 100 total parts by weight; a) 0.5 to 6 parts by weight of a sublimable disperse dye; b) 1 to 15 parts by weight of an anionic sulfonate dispersing agent, said dispersing agent being present in a weight ratio of at least 0.4 part per part by weight of dye; c) 0.25 to 4 parts by weight of a water-soluble film forming resin selected from the groups consisting of a polyvinyl alcohol, a cellulose ether and mixtures thereof; d) 0.05 to 4 parts by weight of non-ionic emulsifying agent of the formula:

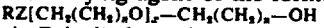

wherein R is: i) the residue of a fatty acid and has 9 to 21 carbon atoms and no more than 2 double bonds per molecule, or ii) a benzene nucleus substituted by at least one hydrocarbon group having 6 to 12 carbon atoms and optionally further substituted by 1 to 3 hydrocarbon group having 1 to 12 carbon atoms; n is 1 to 3; x is 3 to 80; and Z is $-CH_2O-$ or $-COO-$, provided that Z is $-CH_2O-$ when R is a benzene nucleus; e) 5 to 25 parts by weight of a hydrocarbon mineral oil which has an International boiling point in the range of 290°F. to 420°F. and which is at least 50% distilled in the boiling range of from 300°F. to 450°F.; f) 45 to 95 parts by weight of water; and g) up to 5 parts by weight of water-soluble polysaccharide viscosity modifying agent selected from the group consisting of a water-soluble polysaccharide, a water-soluble polysaccharide derivative and mixtures thereof to provide a final emulsion viscosity in the range of 800 to 5,000 centipoises at 25°C., said paste having a pH of 4.0 to 8.5.

3. A heat transfer printing paste in accordance with claim 2 comprising a hydrocarbon mineral oil-in-water emulsion consisting essentially of, per 100 total parts by weight: a) 0.5 to 6 parts by weight of a sublimable disperse dye; b) 1.5 to 12 parts by weight of an anionic sulfonate dispersing agent selected from the group consisting of a lignin sulfonate, a formaldehyde condensed naphthalenic sulfonate and mixtures thereof, said dispersing agent being present in a weight ratio to dye of from 0.4:1 to 3:1; c) 0.5 to 2.5 parts by weight of a water-soluble film-forming resin selected from the group consisting of a polyvinyl alcohol having a viscosity of 4 to 80 centipoises for a 4% by weight water solution at 20°C., ethylcellulose, methylcellulose, carboxymethylcellulose, hydroxyethylcellulose and mixtures thereof; d) 0.2 to 3 parts by weight of non-ionic emulsifying agent of the formula:

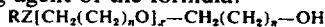

wherein R is the residue of a fatty acid and has 11 to 19 carbon atoms and no more than 1 double bond per molecule, n is 1, X is 15 to 40 and Z is —CH₂O—; e) 10 to 23 parts by weight of a hydrocarbon mineral oil which has an International boiling point of from 300°F. to 400°F., is at least 50% distilled in the range of from 320°F. to 420°F., has a saturated hydrocarbon content of at least 50% by weight and a paraffin content of at least 25%; f) 60 to 95 parts by weight water; and g) up to 3 parts by weight of a water-soluble homopolysaccharide selected from the group consisting of a sodium alginate, ethylcellulose, methylcellulose, carboxymethylcellulose, hydroxyethylcellulose and mixtures thereof to provide a final emulsion viscosity in the range of 1,500 to 3,500 centipoises at 25°C., said paste having a pH of 5.0 to 7.0.

4. A heat transfer printing paste in accordance with claim 3 in which the film-forming resin is polyvinyl alcohol and in which sodium alginate is present as a viscosity modifying agent.

5. A heat transfer printing paste in accordance with claim 3 in which the film-forming resin is polyvinyl alcohol and in which hydroxyethylcellulose is present as a viscosity modifying agent.

6. A heat transfer printing paste concentrate comprising a hydrocarbon mineral oil-in-water emulsion consisting essentially of, per 100 total parts by weight: a) 5 to 12 parts by weight of a sublimable disperse dye; b) 2 to 18 parts by weight of an anionic sulfonate dispersing agent, said dispersing agent being present in a weight ratio of at least 0.4 part per part by weight of dye; c) 2.5 to 12 parts by weight of a water soluble film-forming resin selected from the group consisting of a polyvinyl alcohol, a cellulose ether and mixtures thereof; d) 0.5 to 12 parts by weight of a non-ionic emulsifying agent; e) 30 to 60 parts by weight of a hydrocarbon mineral oil which has an international boiling point in the range of 290°F. to 420°F. and which is at least 50% distilled in the boiling range of from 300°F. to 450°F.; and f) 15 to 40 parts by weight of water.

7. A heat transfer printing paste concentrate in accordance with claim 6 comprising a hydrocarbon mineral oil-in-water emulsion consisting essentially of, per 100 parts by weight: a) 5 to 12 parts by weight of a sublimable disperse dye; b) 2 to 18 parts by weight of an anionic sulfonate dispersing agent, said dispersing agent being present in a weight ratio of at least 0.4 part per part by weight of dye; c) 2.5 to 12 parts by weight of a water-soluble film-forming resin selected from the group consisting of a polyvinyl alcohol, a cellulose ether and mixtures thereof; d) 0.5 to 12 parts by weight of a non-ionic emulsifying agent of the formula:

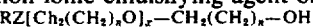

wherein R is: i) the residue of a fatty acid and has 9 to 21 carbon atoms and no more than 2 double bonds per molecule, or ii) a benzene nucleus substituted by at least one hydrocarbon group having 6 to 12 carbon atoms and optionally further substituted by 1 to 3 hydrocarbon groups having 1 to 12 carbon atoms; n is 1 to 3; x is 3 to 80; and Z is —CH₂O— or —COO—, provided that Z is —CH₂O— when R is a benzene nucleus; e) 30 to 60 parts by weight of a hydrocarbon mineral oil which has an International boiling point in the range of 290°F. to 420°F. and which is at least 50% distilled in the boiling range of from 300°F. to 450°F.; and f) 15 to 40 parts by weight of water.

8. A heat transfer printing paste concentrate in accordance with claim 7 comprising a hydrocarbon mineral oil-in-water emulsion consisting essentially of, per 100 total parts by weight: a) 5 to 12 parts by weight of a sublimable disperse dye; b) 6 to 16 parts by weight of an anionic sulfonate dispersing agent selected from the group consisting of a lignin sulfonate, a formaldehyde condensed naphthalenic sulfonate and mixtures thereof, said dispersing agent being present in a weight ratio to dye of from 0.4:1 to 3:1; c) 3 to 8 parts by weight of a water-soluble film-forming resin selected from the group consisting of a polyvinyl alcohol having a viscosity of 4 to 80 centipoises for a 4.0% by weight water solution at 20°C., ethylcellulose, methylcellulose, carboxymethylcellulose, hydroxyethylcellulose and mixtures thereof; d) 1 to 10 parts by weight of nonionic emulsifying agent of the formula:

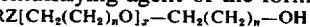

wherein R is the residue of a fatty acid and has 11 to 19 carbon atoms and no more than 1 double bond per molecule, n is 1, X is 15 to 40 and Z is —CH₂O—; e) 40 to 60 parts by weight of a hydrocarbon mineral oil which has an International boiling point of from 300°F. to 400°F., is at least 50% distilled in the range of from 320°F. to 420°F., has a saturated hydrocarbon content of at least 50% by weight and a paraffin content of at least 25%; and f) 15 to 40 parts by weight water.

9. A heat transfer printing paste concentrate in accordance with claim 8 in which the film-forming resin is polyvinyl alcohol.

10. In a method of heat transfer printing comprising printing on a cellulosic substrate with a heat transfer printing paste containing a sublimable disperse dye, bringing said printed cellulosic substrate into print-facing contact with a textile to be printed, and subjecting the resulting laminate to a temperature in the range of from 340°F. to 500°F. for from 10 seconds to 2 minutes to sublime the dye whereby the print is transferred from the cellulosic substrate to the textile; the improvement of employing as the printing paste a printing paste in accordance with claim 1.

11. The method of claim 10 in which the printing paste of claim 3 is employed.

* * * * *